United States Patent [19]

Pennington et al.

[11] Patent Number: 4,921,658

[45] Date of Patent: May 1, 1990

[54] METHOD FOR PREPARING REINFORCED THERMOSET ARTICLES

[75] Inventors: Donald W. Pennington, Baton Rouge, La.; Jane K. McLemore, Midland, Mich.

[73] Assignee: The Dow Chemical Company, Midland, Mich.

[21] Appl. No.: 125,741

[22] Filed: Nov. 9, 1987

Related U.S. Application Data

[63] Continuation of Ser. No. 740,676, Jun. 3, 1985, abandoned.

[51] Int. Cl.$^5$ .............................................. B29C 67/00
[52] U.S. Cl. ..................................... 264/86; 264/122; 264/128; 264/137; 264/257
[58] Field of Search ................. 264/128, 86, 122, 257, 264/136, 137

[56] References Cited

U.S. PATENT DOCUMENTS

| | | |
|---|---|---|
| 3,515,625 | 6/1970 | Sedlak et al. |
| 3,621,092 | 11/1971 | Hofer .................................. 264/322 |
| 3,956,447 | 5/1976 | Denommee et al. ............... 264/135 |
| 4,025,686 | 5/1977 | Zion ..................................... 428/310 |
| 4,113,908 | 9/1978 | Shinomura .......................... 428/113 |
| 4,327,145 | 4/1982 | Mitani et al. ....................... 428/290 |
| 4,425,126 | 1/1984 | Butterworth et al. .............. 604/366 |
| 4,426,470 | 1/1984 | Wessling et al. ...................... 524/35 |
| 4,431,696 | 2/1984 | Di Drusco et al. ................. 428/212 |
| 4,670,331 | 6/1987 | Radvan et al. ...................... 428/303 |
| 4,690,860 | 9/1987 | Radvan et al. ...................... 428/290 |
| 4,734,321 | 3/1988 | Radvan et al. ...................... 428/283 |

FOREIGN PATENT DOCUMENTS 55230 5/1981 Japan .

*Primary Examiner*—Jan H. Silbaugh
*Assistant Examiner*—Mary Lynn Fertig
*Attorney, Agent, or Firm*—Dan R. Howard; Thomas A. Ladd

[57] ABSTRACT

A process for preparing reinforced thermoset articles of manufacture from a lofted composite sheet employed as a skeleton or preform which is impregnated with a thermoset resin composition and cured. A reinforced thermoset article of manufacture prepared from a lofted composite impregnated with a thermoset resin composition and cured is also provided.

6 Claims, No Drawings

METHOD FOR PREPARING REINFORCED THERMOSET ARTICLES

CROSS-REFERENCE TO RELATED APPLICATION

This is a continuation, or application Ser. No. 740,676 filed June 3, 1985, now abandoned.

BACKGROUND OF THE INVENTION

The present invention is directed toward a process for preparing reinforced thermoset articles of manufacture by employing lofted random-fiber composites as a preform.

Generally, in the manufacture of reinforced thermoset articles a plurality of fiber-glass cloth is laid-up in a mold over which a thermoset resin is sprayed and molded. This procedure requires that each article be laid-up separately in a mold which lowers uniformity between articles and is time consuming. This method is also undesirable where intricate parts are to be prepared.

In another aspect, the manufacture of reinforced thermoset articles can consist of injection molding or spraying a mixture of thermoset resin and fiber filaments into a compression mold to form a molded article. Again, undesirable nonuniformity is common and difficulty in forming intricate articles are encountered. This is, at least in part, due to the varying flow rates between the fiber reinforcement and thermoset resins.

In view of these common problems, it is desirable to develop improved processes for forming reinforced thermoset articles. Such a process is the subject of this invention.

SUMMARY OF THE INVENTION

The present invention is a process for preparing reinforced thermoset articles comprising (a) forming a lofted composite into a predetermined shape, (b) impregnating the formed lofted composite with a thermoset resin composition and (c) curing the thermoset resin composition. The process can include the additional step of heating a densified random fiber polymeric composite sheet to form the lofted composite sheet employed in step (a). Generally, the thermoset resin composition can comprise an epoxy, vinyl ester resin or polyester resin. The lofted composite sheet can comprise a heat fusible resin, reinforcement fibers, and binder material.

In yet another aspect, the present invention provides for a reinforced thermoset article of manufacture prepared from a lofted composite impregnated with a thermoset resin composition and cured. The lofted composite comprises a heat fusible resin, reinforcement fibers and a binder. Generally, the heat fusible resin is polyethylene, high-density polyethylene, or polypropylene and the reinforcement fibers are glass fibers. The thermoset resin composition employed for the article of manufacture can comprise an epoxy, vinyl ester resin or polyester resin.

The present invention provides an advantageous method for preparing thermoset articles of manufacture. In one aspect, the lofted composite provides a rugged, durable, preform and a method for controlling the glass content throughout a complex molded part. In yet another aspect, the lofted composite method for preparing a thermoset article allows for the reproducibility of properties from one part to the other and the elimination of a time consuming manual lay-up normally associated with the manufacture of thermoset articles.

DETAILED DESCRIPTION OF THE INVENTION

In general, the subject process comprises the fabrication of a reinforced thermoset article from a low-density, random-fiber polymeric composite (hereinafter, lofted composite) which is impregnated with a thermoset resin and cured. The lofted composite can be uniformly molded into a variety of complex shapes which can be stored without loss of shape and, subsequently, impregnated with a thermoset resin to form a reinforced thermoset article of manufacture.

The reinforced thermoset articles of the invention comprise, in major part, a lofted composite either molded into a preform or other shape. In one aspect, the lofted composite is shaped and placed into a mold where it can be saturated with a desired thermoset resin. Thermoset resin is meant to include the polymeric material and curing agents necessary to crosslink the resin into a thermoset. After the lofted composite is saturated the mold is closed and the impregnated article is cured. This thereby converts the lofted sheet into a thermoset article of manufacture.

The subject thermoset articles are prepared from a low-density random-fiber composite sheet. The random-fiber composite sheet is generally prepared by the aqueous wet-laid technique as disclosed in U.S. Pat. No. 4,426,470, herein incorporated by reference. In particular, U.S. Pat. No. 4,426,470 discloses a predensified sheet which is pressed with a calender or niproll after drying the composite to provide a sheet having increased tensile and tear strength. Other forms of densified composite sheets are applicable to this process and are disclosed in the art as polymeric composites, fiber-reinforced polymeric sheets (U.S. Pat. No. 4,431,696), plastic composites and fiber mats. The particular method for forming the composite sheet is not critical provided a densified sheet is produced.

The density of the particular sheet prior to preparation of the low-density random-fiber polymeric composite or lofted composite will depend on the individual heat fusible resins and reinforcing fibers employed. A typical densified random-fiber composite sheet containing a polyolefin matrix and glass fibers would have a density from about 0.75–1.75 g/cc, preferably 0.9–1.30 g/cc.

In general, the random-fiber composite sheet will comprise a heat fusible resin into which a reinforcing fiber can be incorporated. In addition, the composite may contain other additives such as cellulose, latex binders, inorganic pigments, antioxidants, flocculants, and other ingredients appropriate for a composite sheet.

A major ingredient for the preparation of the lofted composite is the reinforcement fibers. Generally, the reinforcement fibers are described as being either organic or inorganic products such as graphite, metal, ceramic, polyamides, aromatic polymers, polyesters, cellulose and glass. Glass fibers are the preferred choice of most applications due to their strength and low cost. However, specialized applications may make other fibers not herein disclosed more suitable. The particular compositional identity of the fiber is not deemed to be critical to the subject process and the skilled artisan may find any number fibers to perform equally well.

The reinforcing fibers are essentially uniformly dispersed throughout the resinous mixture and are randomly oriented in the plane defined by the composite, i.e., there are substantially no alignment of the fibers in particular direction within said plane. The fibers employed have an average length of from about 0.125 to about 1.00 inch (3–25 mm), preferably from about 0.18 to about 0.5 inch (4–12 mm). Additionally, the fibers have an aspect ratio (length to diameter ratio) of from about 40 to more preferably 100. Generally, the reinforcement fiber is present in the densified composite sheet from about 10 to about 80 percent by weight of the densified composite sheet, preferably from about 30 to about 60 percent by weight of the densified composite sheet.

The heat fusible polymer which can be employed in the composite sheet are those polymer particles which are capable of deformation under heat and/or pressure to join into a unitary structure. These fusible polymers can be either thermoplastic or thermoset resins. The fusible organic polymer component is desirably a hydrophobic water-insoluble polymer. These polymers may be in the form of either powders or dispersions. Suitable fusible organic polymers are polyethylene, chlorinated polyethylene, high-density polyethylene, polycarbonates, nylon, styrene, homopolymers and copolymers. Other suitable fusible organic polymers are disclosed in U.S. Pat. No. 4,426,470, herein incorporated by reference. The polymers are generally employed in an amount from about 19 to about 79 percent by weight of the solids dry weight basis.

A third component of the composite sheet is the binder. The binder is used in adhering the suspended components in the aqueous phase such that they can be destabilized and collected into a sheet. Typically, the binders are starch, synthetic polymers and natural polymers. One such binder is a latex comprising an aqueous colloidal dispersion of substantially water-insoluble organic polymers having anionic or cationic bound charges in an amount sufficient to provide stabilization of the colloid but insufficient to cause the polymer to be water-soluble. Further disclosure as to binders is found in U.S. Pat. No. 4,426,470.

Where necessary, a polymeric flocculant opposite in charge to the charged binder can be employed. However, other means of destabilizing the slurry can be employed which are suitable for the particular binder utilized. Examples of suitable flocculants include partially hydrolyzed polyacrylamide for cationic systems and modified cationic polyacrylamide and diallyldiethylammonium chloride for anionic systems.

Additionally, the composite sheets can comprise a variety of other ingredients such as UV stabilizers, antioxidants, bacteriocides or colorants. Optionally, the addition of a low level of synthetic fibers such as a polyolefin paste or pulp may be desirable. Polymeric fibers have been found to be advantageous in the preparation of polymeric composites. Typical polymeric fibers are polyethylene, polypropylene, polyvinylchloride, polyester, polystyrene and ABS (acrylonitrile/butyldiene/styrene copolymer). Generally, the polymeric fibers are present from about 1 to about 10, preferably from about 3 to about 5 weight percent based on total solids.

The lofted composite is formed from the aforedescribed densified polymeric sheet by heating the sheet which causes it to loft. "Loft" is a term employed to indicate that the reinforced fiber composite sheet has been expanded to create a low-density random fiber polymeric composite having a high void structure.

Physically, lofting is where the reinforced fiber composite sheet is subjected to heat which softens the heat fusible polymer and allows the reinforcing fibers to relax. The reinforcing fibers are initially placed under a state of stress during the preparation of the densified composite sheet which causes the fibers to bend slightly where they overlap. Therefore, the strained fibers have a tendency to straighten or relax when the polymeric matrix is softened.

Lofting can be induced by any heat treatment means sufficient to soften the polymeric matrix to allow the reinforcing fibers to expand the sheet. Such heating means are, for example, oven, infrared radiation, hot impinging air, or microwave. After the densified random fiber composite sheet is lofted to form a lofted composite, the lofted material while hot can be formed into a shaped article. The shaped article can then be saturated with a thermosetting resin and cured.

Thermosetting resins suitable for the subject process include those that can be successfully impregnated into the skeletal configuration formed from the lofted composite. Typical thermoset resins which can be employed are the epoxies, vinylized epoxies, vinyl esters, phenolics, polyesters, phenolformaldehydes and novolac resins. Preferred thermosets are epoxy, vinyl ester, novolac, polyesters and phenolic resins. More preferred are diglycidylether of bisphenol-A type epoxies, epoxy novolac resin and phenolformaldehyde type resins. Other suitable epoxies are disclosed in Lee and Neville, *Handbook of Epoxy Resins,* Chapter 2, McGraw Hill, New York (1967).

Curing agents which can be employed with the subject thermosets include those which will be activated upon the final molding of the lofted composite sheet impregnated with the thermoset resin such that the desirable articles of manufacture can be prepared. Generally, the choice of the curing agent will be decided by the particular thermoset resin employed. Examples of typical curing agents which are suitable for the subject invention are free-radical initiators such as benzoyl peroxide, aliphatic and aromatic amines or polyamines, polythiols, phenolics, anhydrides, diaminodiphenolsulfone (DADS) methylenedianaline, and Versamide ®, a trademark of General Mills Chemical, Inc. for reactive polyamide resins. Curing agents and their influences are known in the literature wherein activation temperatures or conditions are readily available. The particular influence of curing agents can be found in *Handbook of Epoxy Resins,* (supra) and in *Chemical Reactions of Polymers,* Interscience Publishers, New York, pp 912–926, (1967) as well as other reference works and trade journals.

In addition to the above mentioned curing agents, accelerators can also be employed which are commonly recognized in thermoset formulations. For example, a free-radical initiator can be employed to accelerate the thermoset reaction. If the reaction is to be carried out at or near room temperature, an initiator such as cobalt naphthenate may be combined with methylethylketone peroxide. If the reaction is to be carried out at a higher temperature, for example 250° F., an intiator such as benzol peroxide may be employed. Room temperature cures will generally require from 20 to 30 minutes; whereas, a thermoset reaction conducted at approximately 250° F. would take about 3 minutes.

In one aspect, the lofted composite is molded into a desired shape and employed as a preformed reinforcement core in the preparation of a thermoset article of manufacture. The subject process provides many benefits and advantages over other methods of forming thermoset articles of manufacture. Advantages would include control of the glass content throughout the article, reproducibility of properties from one article to the next, elimination of time consuming lay-ups, a rugged durable preform as compared to fragile mats of reinforcement build-up and a less labor-intensive method of forming glass reinforced thermoset articles.

In another aspect, the lofted composite can be employed as a preform reinforcement upon which further layers of a thermoset resin and chopped glass reinforcement are sprayed.

In yet another aspect, additional layers of fiber glass cloth or felt can be applied to the lofted composite preform prior to applying the thermoset resin or subsequent to impregnating the lofted composite with a thermoset resin.

In a more traditional manner, the preform made from the lofted composite can be placed in one-half of a matching die mold and impregnated with a thermoset resin composition. The mold can then be closed and a thermoset article manufactured.

It is believed that other means for employing the subject process for preparing thermoset articles of manufacture from a lofted composite can be determined by those skilled in the art without departing from the spirit of the invention herein disclosed and described. In this vein, the following examples are provided to more clearly illustrate means for practicing the subject invention.

Example 1

A thermoset board was prepared from a lofted thermoplastic composite sheet.

A lofted composite sheet was prepared from a densified random-fiber composite sheet (approximately bulk density 1.20) containing 61.4 percent high density polyethylene polymer, 35.0 percent glass fiber and 3.6 percent latex binder by heating for 5 minutes in an oven at 370° F. A 1,000 gram (g) sample of the lofted composite was treated with 1,500 g of a vinyl ester resin, Derakane ® 411-45, (a trademark of The Dow Chemical Company for a vinyl ester resin having 45 percent monomeric styrene) containing 0.1 percent cobalt naphthenate (active basis) and 1.5 percent methylethylketone peroxide by weight. The lofted sheet was impregnated with a resinous solution and allowed to cure for about one-half hour at room temperature (65° to 75° F.). After curing, the impregnated lofted sheet was examined and was found to be a thermoset board.

The foregoing example indicates that a thermoplastic composite sheet could be impregnated with a thermoset resin to form a thermoset board.

Example 2

In this example, a molded lofted composite was employed as a preformed reinforcement for use with a thermoset resin.

A densified high-density polyethylene random-fiber composite containing 35 percent glass fibers (3/16 of an inch in length) was heated in an oven in order to form a lofted sheet. While the sheet was still hot, it was formed to a complex shape using a mold. The molded part was then treated with Derakane ® 411-45 (a trademark of The Dow Chemical Company, identified supra) containing 0.5 percent cobalt naphthanate accelerator and 1.0 percent methylethylketone peroxide curing agent. The thermoset resin was applied to both sides of the one-quarter inch thick lofted composite preform. After curing overnight, the preform exhibited signs of porosity and therefore an additional coating of the thermoset resin was applied to both sides of the lofted composite preform. The lofted composite was then cured for an additional 1 hour in a 150° F. oven. A well formed thermoset article was thereby produced.

What is claimed is:

1. A process for preparing reinforced thermoset article comprising
   (a) preparing a heat-fusible reinforced polymer sheet by forming a dilute aqueous slurry of
      (i) from about 19 to about 79 percent of solid heat-fusible organic polymer particles,
      (ii) from about 10 to about 80 percent of reinforcing fibers, and
      (iii) from about 1 to about 10 percent of a latex binder of a substantially water-insoluble organic polymer having either anionic or cationic bound charges, the percentages being by weight based on a dry solids basis;
   (b) flocculating the slurry during agitation with a polymeric flocculant opposite in charge to that of the latex binder;
   (c) collecting the solids in the form of a mat;
   (d) dewatering the mat;
   (e) drying the mat;
   (f) densifying and consolidating the mat with heat and pressure to a densified composite;
   (g) permitting the densified composite to loft to a predetermined shape;
   (h) impregnating said formed lofted composite with a thermoset resin composition; and
   (i) curing said thermoset resin composition.

2. The process of claim 1, wherein said densified mat is lofted by subjecting said densified composite to heat sufficient to soften the heat fusible polymer and allow reinforcing material to relax.

3. The process of claim 1 where said thermoset resin composition comprises an epoxy, vinyl-ester resin or polyester resin.

4. The process of claim 1 where said heat fusible resin is polyethylene, high density polyethylene, or polypropylene.

5. The process of claim 1 where said reinforcement fibers are glass fibers.

6. The Process of claim 1 wherein the lofted composite is impregnated by saturating it with the thermoset resin composition.

* * * * *